C. H. GUNN.
LINING FOR FRICTION SURFACES.
APPLICATION FILED JAN. 8, 1918.
1,298,335. Patented Mar. 25, 1919.
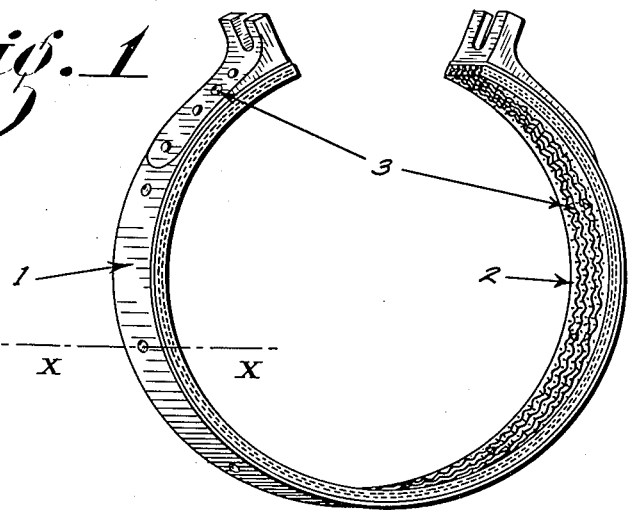
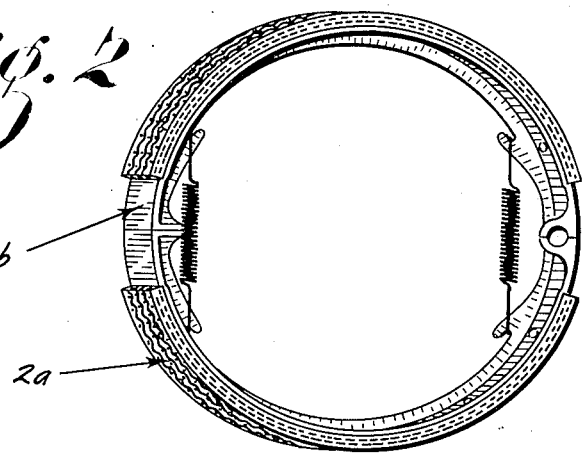
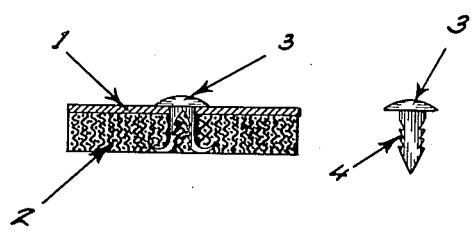
INVENTOR.
Charles H. Gunn
BY
ATTORNEY.

UNITED STATES PATENT OFFICE.

CHARLES H. GUNN, OF SACRAMENTO, CALIFORNIA.

LINING FOR FRICTION-SURFACES.

1,298,335.

Specification of Letters Patent.   Patented Mar. 25, 1919.

Application filed January 8, 1918.   Serial No. 210,833.

*To all whom it may concern:*

Be it known that I, CHARLES H. GUNN, a citizen of the United States of America, residing at Sacramento, in the county of Sacramento, State of California, have invented certain new and useful Improvements in Linings for Friction-Surfaces; and I do declare the following to be a clear, full, and exact description of the same, reference being had to the accompanying drawings, and to the characters of reference marked thereon, which form a part of this application.

This invention relates to improvements in lining for surfaces which are subjected to a great deal of frictional wear such as transmission bands, brake bands, or the like.

The object of the invention is to produce a lining which will have a maximum wearing quality combined with a maximum frictional resistance.

Another object of the invention is to provide a means for securing the lining so that as it wears away, it will still be held intact until worn down to the very metal over which it is placed.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a perspective view of the lining as it appears when mounted on a transmission brake band used on the planetary type of transmission mechanism.

Fig. 2 is a similar view showing the application of the lining to brake bands.

Fig. 3 is a sectional view taken on a line X—X of Fig. 1 to show the holding rivet in position.

Fig. 4 is a side elevation of the holding rivet.

Referring now more particularly to the characters of reference on the drawings, the numeral 1 designates the metal band or other structure on which the lining is to be placed. The lining, itself, comprises laminations of canvas 2 laid side by side and vulcanized together so as to present the edges of the canvas to the wearing surface of the lining. Holding rivets 3 are provided with edge serrations 4 so that when the rivets are driven through the metal 1 and lining 2 these serrated edges 4 will grip the lining for the full length of the rivet. Thus, as the lining wears down in use, it will still be held in position on the holders 1 even down until the lining is completely worn out adjacent the holders.

In the form of rivet shown in Fig. 3, the head of the rivet is provided with a plurality of flexible prongs extending at right angles thereto. These prongs pass through the lining and are then bent outwardly and pressed into the wearing surface of the lining.

I have found out, from actual use, that the edgewise relation of the vulcanized canvas provides a lining of great wearing quality. At the same time, this edgewise relation tends to provide a much greater frictional resistance than other forms of linings now in common use.

In Fig. 1 I have shown the lining as it would apply to a transmission brake band.

In Fig. 2 the lining 2ª is mounted on wheel brake bands 1ᵇ. The invention may be used equally well on either or on any other form of surface encountering frictional wear.

From the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention, what I claim as new and useful and desire to secure by Letters Patent is:—

The combination with a brake band, of a lining therefor, such lining consisting of laminations of canvas laid side by side to present their edges to the wearing surface and being vulcanized together to form a continuous strip, and means for fastening the lining to the brake band, such means consisting of rivets passing through the band and lining, each having a plurality of flexible prongs extending at right angles from the head, the prongs being bent outwardly and pressed into the wearing surface of the lining.

In testimony whereof I affix my signature in presence of two witnesses.

CHARLES H. GUNN.

Witnesses:
CHARLES M. BECKWITH,
E. B. CURTIS.